UNITED STATES PATENT OFFICE.

WILHELM PICKHARDT, OF NEW YORK, AND HERMANN ENDEMANN, OF BROOKLYN, N. Y., ASSIGNORS TO WILHELM PICKHARDT AND ADOLF KUTTROFF, BOTH OF NEW YORK, N. Y.

MEDICAL COMPOUND.

SPECIFICATION forming part of Letters Patent No. 254,096, dated February 21, 1882.

Application filed December 6, 1881. (Specimens.)

*To all whom it may concern:*

Be it known that we, WILHELM PICKHARDT, a citizen of the United States, residing at New York, in the county and State of New York, and HERMANN ENDEMANN, a citizen of the United States, residing at Brooklyn, in the county of Kings and State of New York, have invented new and useful Improvements in Medical Compounds, of which the following is a specification.

This invention relates to a medical compound which is obtained by the action of tartaric acid on Skraup's chinoline.

In carrying out our invention we take the artificial chinoline of Skraup, or we prepare such artificial chinoline according to the Patent No. 241,738, granted to Zdenko H. Skraup May 17, 1881, and then we treat the same with tartaric acid. The quantity of the materials must be in the proportion of about one hundred and sixty parts, by weight, of the tartaric acid to one hundred and thirty parts of chinoline; or, in other words, the quantity of acid used must be such that all the bases present in the chinoline are converted into acid salts, which is best assured by using an excess of the acid. The tartaric acid in the proportion above named is dissolved in about eight hundred parts of water, and after this solution has been heated to about 100° Celsius the chinoline is added. The chinoline which dissolves in the heated solution forms a tartrate, which, on cooling, crystallizes, while the excess of the acid used, together with the impurities, remain in the mother-liquor. The crystals are then brought upon a filter and freed from the mother-liquor by washing with water or by other mechanical means, such as suction. The mother-liquor and wash-water bear concentration by heat; but they may also be used as a solvent for a new portion of chinoline until the impurities have accumulated to such an extent that the salt cannot be obtained sufficiently pure.

The acid tartrate of Skraup's chinoline, which is obtained by the process above described, is a colorless salt crystallizing from its aqueous solution in concentrically-grouped white needles. It is not very soluble in cold water and considerably more in hot water, forming a colorless solution. Caustic alkalies added to the aqueous solution produce at first milky turbidity, which, after some time, subsides, the chinoline being thus liberated, collecting in oily drops either at the bottom or surface of the liquid, which depends upon the specific gravity of the water solution. This solution contains the tartrate of the alkali used, the presence of which may be proved in the usual manner.

The acid tartrate of Skraup's chinoline is readily soluble in hydrochloric acid, and it also crystallizes from this solution, provided the amount of acid used as a solvent is not too large. The salt has always an odor resembling that of chinoline, showing that it is liable to decomposition. High heat in drying should therefore be avoided. A temperature in the drying-room of from 40° to 60° Celsius proves to be most advantageous.

Our acid tartrate of Skraup's chinoline, being entirely free from impurities which might prove injurious to health, may be used with advantage for medical purposes as a substitute for quinine.

We are aware that various recent publications mention a tartrate of chinoline. The chinoline used in the preparation of this salt, however, is prepared from cinchonine, (see Donath Berichte der Deutsche Chem. Ges., Vol. XIV., pages 178 and 1769,) and its properties are different. Our compound is an acid tartrate. It is perfectly white and its aqueous solution is colorless, and the chinoline liberated from it by means of potash is also colorless, while the tartrate of chinoline which is described by Donath and in the other publications is white with a reddish cast, and the chinoline liberated from it by means of potash turns yellow by contact with the atmosphere, and contains lepidine and other bases of the chinoline series.

What we claim as new, and desire to secure by Letters Patent, is—

As a new article of manufacture, the acid tartrate of Skraup's chinoline, hereinbefore described, and having the characteristics above set forth.

In testimony whereof we have hereunto set our hands and seals in the presence of two subscribing witnesses.

WM. PICKHARDT. [L. S.]
H. ENDEMANN. [L. S.]

Witnesses:
W. HAUFF,
E. F. KASTENHUBER.